United States Patent [19]
Honsowetz et al.

[11] Patent Number: 5,907,219
[45] Date of Patent: *May 25, 1999

[54] MOTOR VEHICLE CIRCUITRY INCLUDING A PRE-DRIVER CONTROL

[75] Inventors: Eric K. Honsowetz, Redford; Susan E. Viergever, Detroit, both of Mich.

[73] Assignee: UT Automotive Dearborn, Inc., Dearborn, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/785,780

[22] Filed: Jan. 21, 1997

[51] Int. Cl.$^6$ ...................................................... H05B 37/00
[52] U.S. Cl. ............................... 315/77; 315/82; 307/10.8
[58] Field of Search .................... 315/82, 77, 76, 315/80, 291; 307/9.1, 10.8

[56] References Cited

U.S. PATENT DOCUMENTS

| | | |
|---|---|---|
| 3,671,802 | 6/1972 | Ballou . |
| 3,903,475 | 9/1975 | Mokrani et al. . |
| 4,473,871 | 9/1984 | Fuchshuber . |
| 4,645,974 | 2/1987 | Asai ............................................ 315/50 |
| 4,847,515 | 7/1989 | Nakach et al. . |
| 5,086,253 | 2/1992 | Lawler . |
| 5,497,322 | 3/1996 | Kolomyski et al. . |
| 5,517,064 | 5/1996 | Murakami . |
| 5,519,263 | 5/1996 | Santana, Jr. . |
| 5,522,617 | 6/1996 | Swart . |

FOREIGN PATENT DOCUMENTS 90 12 042  11/1991  Germany .

*Primary Examiner*—Don Wong
*Assistant Examiner*—David H. Vu
*Attorney, Agent, or Firm*—Emch, Schaffer, Schaub & Porcello Co.

[57] ABSTRACT

In the circuitry of this invention, a pre-drive controls the output voltage from the driver to the load. The drive includes a resistor and an output transistor. This circuitry lowers the heat dissipation of the transistor of the output driver. Variable voltage input may supply power to the pre-driver.

4 Claims, 2 Drawing Sheets

MOTOR VEHICLE CIRCUITRY INCLUDING A PRE-DRIVER CONTROL

TECHNICAL FIELD

This invention relates to a linear output drive circuitry with a low power output driver. More specifically, this circuitry may be used in a dimmer switch of a motor vehicle.

BACKGROUND OF THE INVENTION

FIG. 1 is a prior art circuit diagram for a lighting system of a motor vehicle. FIG. 1 shows a conventional circuit using a 12 V battery as power supply 1. Lamp 2 represents the load and driver 3 energizes lamp 2. Driver 3 provides a current to lamp 2. Control 4 controls the current to driver 3. This is a typical circuit for use in a dimmer switch of a motor vehicle. In this conventional circuit, the power loss across the driver 3 from a conventional storage battery often is 5 to 10 watts, As a result, expensive drivers with high power capability must be used.

DISCLOSURE OF THE INVENTION

In the circuitry of this invention, variable DC voltage 10 input is supplied to a pre-drive 20 section through an input resistor $R_1$. The addition of a power resistor $R_3$ in series with the output driver diverts the power from the output transistor to the resistor. This output scheme lowers the heat dissipation of the transistor $Q_3$ output drive. A less robust output driver can, therefore, be utilized with the power dissipation now primarily in resistor $R_3$. A smaller heatsink may be used or the need for a heatsink may be eliminated. This will result in potential packaging advantages.

BEST MODE OF CARRYING OUT INVENTION

In the circuitry of this invention, variable DC voltage 10 input is supplied to a pre-drive 20 circuit through an input transistor $R_1$. The pre-drive circuit controls the voltage at the base of the output transistor $Q_3$ through transistor $Q_2$ by using the transistor $Q_3$ in an emitter follower mode. Output transistor $Q_3$ in the driver controls voltage to the load $R_4$ also using the emitter follower mode. Power from power supply 1 is supplied to transistor $Q_3$ through resistor $R_3$. A low value is chosen for $R_3$ such that the voltage dropped across it can be small, allowing maximum voltage at the load $R_4$. When the voltage on the base of $Q_3$ is lowered the voltage drop in the load circuit ($R_3$, $Q_3$, $R_4$) is across $R_3$, thus alleviating the power dissipation in transistor $Q_3$.

Figure 1:
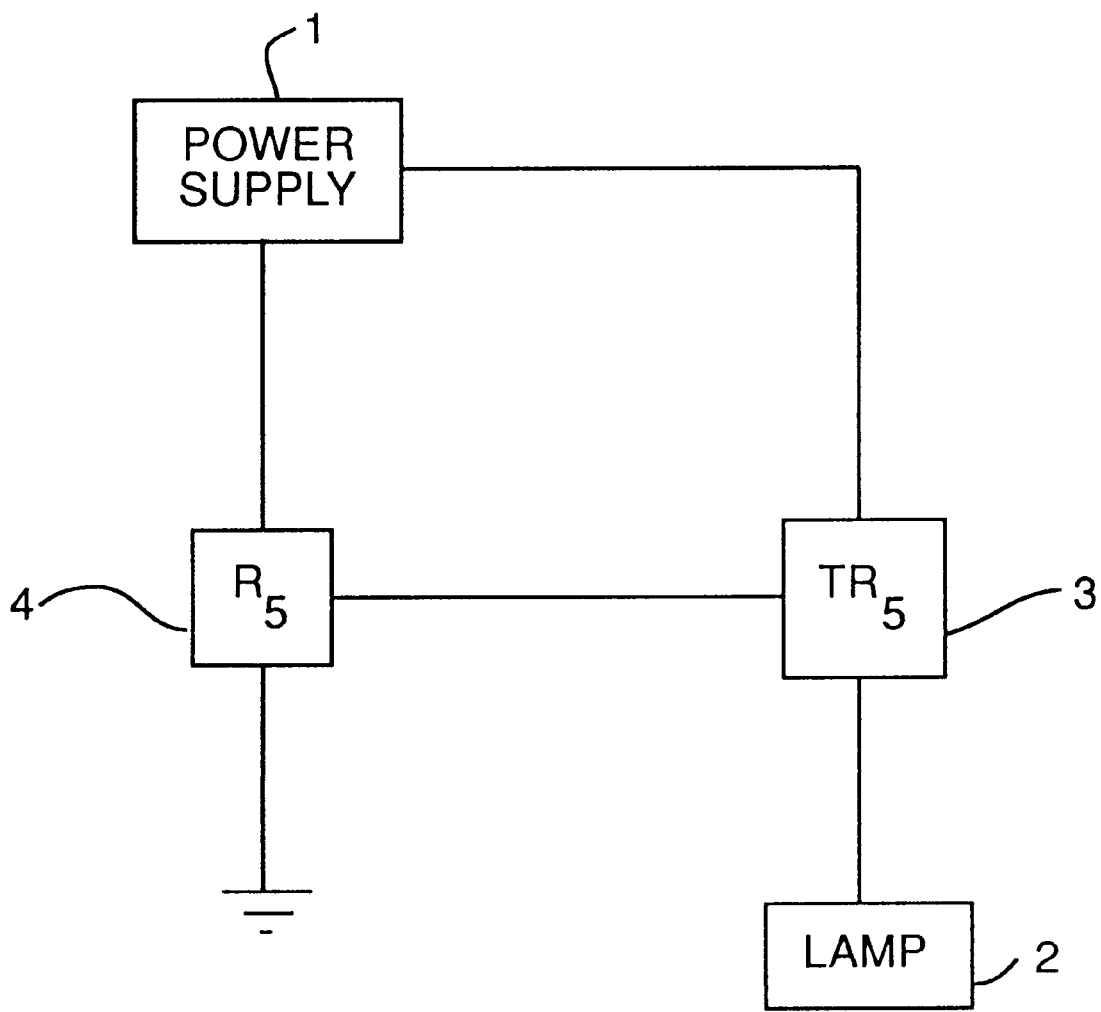
FIG. 1 a circuit diagram showing for a prior art circuit for motor vehicle dimmer switches.
Figure 2:
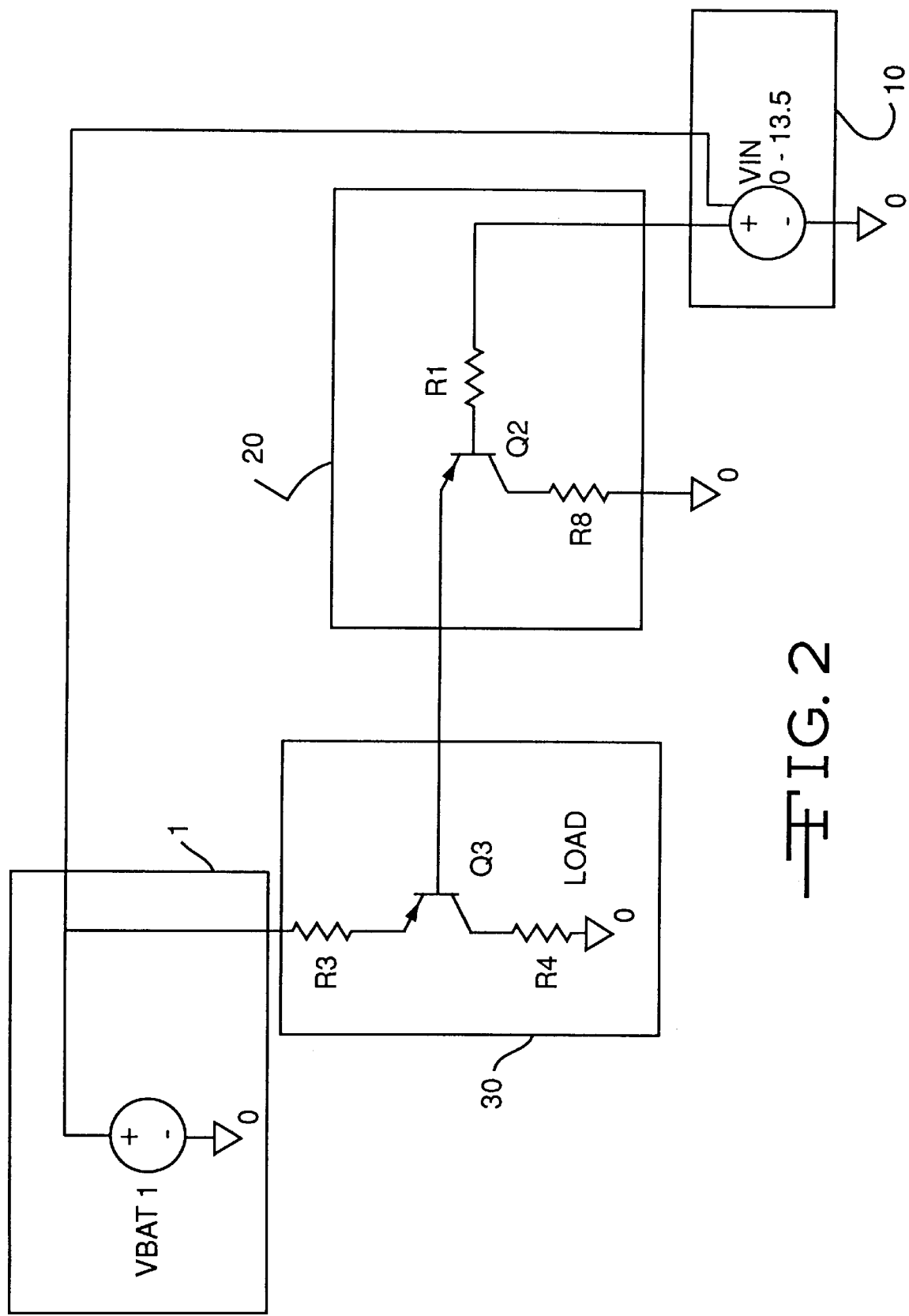
FIG. 2 is a block and circuit diagram of the circuit of our invention.

FIG. 2 is a block and circuit diagram showing 12 V battery as supply power 1. Power supply 1 is connected to voltage input (VIN) 10 which supplies a variable DC voltage input to pre-drive 20 through input resistor $R_1$. Pre-driver 20 controls drive 30 through transistor $Q_2$. Transistor $Q_3$ in drive 30 provides power to a load O through resistor $R_4$. Power supply 1 provides power to drive 30 through resistor $R_3$ which power transistor $Q_3$. Load O typically is a motor vehicle lamp.

Without the use of $R_3$, transistor $Q_3$ is the primary control for voltage drop to a load O through resistor $R_4$. Without $R_3$, $Q_3$ is the primary power dissipater. The circuitry of our invention keeps $Q_3$ cool, yet allows voltage control. In a conventional circuit, the voltage drop, for control, across $Q_3$ is 5 to 10 volts. The circuitry of our invention lowers this voltage drops across $Q_3$ to as little as 0.5 volts.

In operation, the voltage input to the pre-driver can be varied from 0 to 13.5 volts. For purposes of illustrating the invention, assume a current of 1 amperes to the load $R_4$ at a voltage across the load of 5 volts so that the power loss or gain can be easily calculated. In a conventional circuit, the power loss across the transistor $Q_3$ would be 8.3 watts. In the circuit, of this invention, the power loss across transistor $Q_3$ of drive 30 can be as little as 0.3 watts.

The circuit of this invention moves the power loss to resistor $R_3$. In the case of a 5 watt lamp for the load, the power loss across $R_3$ is 8 watts with only a 0.3 watt drop across transistor $Q_3$.

The preferred embodiment of this invention is an electrical circuit for a motor vehicle comprising a power supply, a load energized by an amount of power supplied by the power supply, a driver for supplying the amount of power supplied to the load, the driver being connected between the power supply and the load, a pre-driver for controlling the amount of power supplied to the driver, the pre-driver being connected between the power supply and the driver, wherein the pre-driver comprises a resistor and a transistor, the power supply being connected to the resistor, the resistor being connected to the transistor and the transistor being connected to the driver. The power supply supplies power to the load through the driver. The driver includes a resistor and a transistor, the resistor being connected between the power supply and the transistor of the driver.

The preferred electrical circuit includes a variable voltage input, the input being connected between the power supply and the resistor of the pre-driver. The variable voltage input also may be a rheostat switch or a potentiometer.

We claim:

1. An electrical circuit for a motor vehicle consisting essentially of:

a power supply;

a load energized by an amount of power supplied by the power supply;

a single power path of a driver for supplying the amount of power supplied to the load, the driver being directly connected between the power supply and the load;

the driver comprising a resistor and an output transistor, the resistor being connected directly between the power supply and the transistor, and the transistor being connected to the load; and a single control path of a pre-driver for controlling the amount of power supplied to the load, the pre-driver being connected to the power supply and directly connected to the driver, wherein the pre-driver comprises a resistor and a transistor, the power supply being connected to the pre-driver resistor, the pre-driver resistor being connected directly to the pre-driver transistor and the pre-driver transistor being connected directly to the driver transistor.

2. An electrical circuit according to claim 1 further comprising a control directly connected between the power supply and the pre-driver.

3. An electrical circuit according to claim 1 further comprising a variable voltage input control directly connected between the power supply and the pre-driver resistor.

4. An electrical circuit according to claim 1 further comprising an additional resistor being directly connected between the driver transistor and the load.

* * * * *